Figure 1:
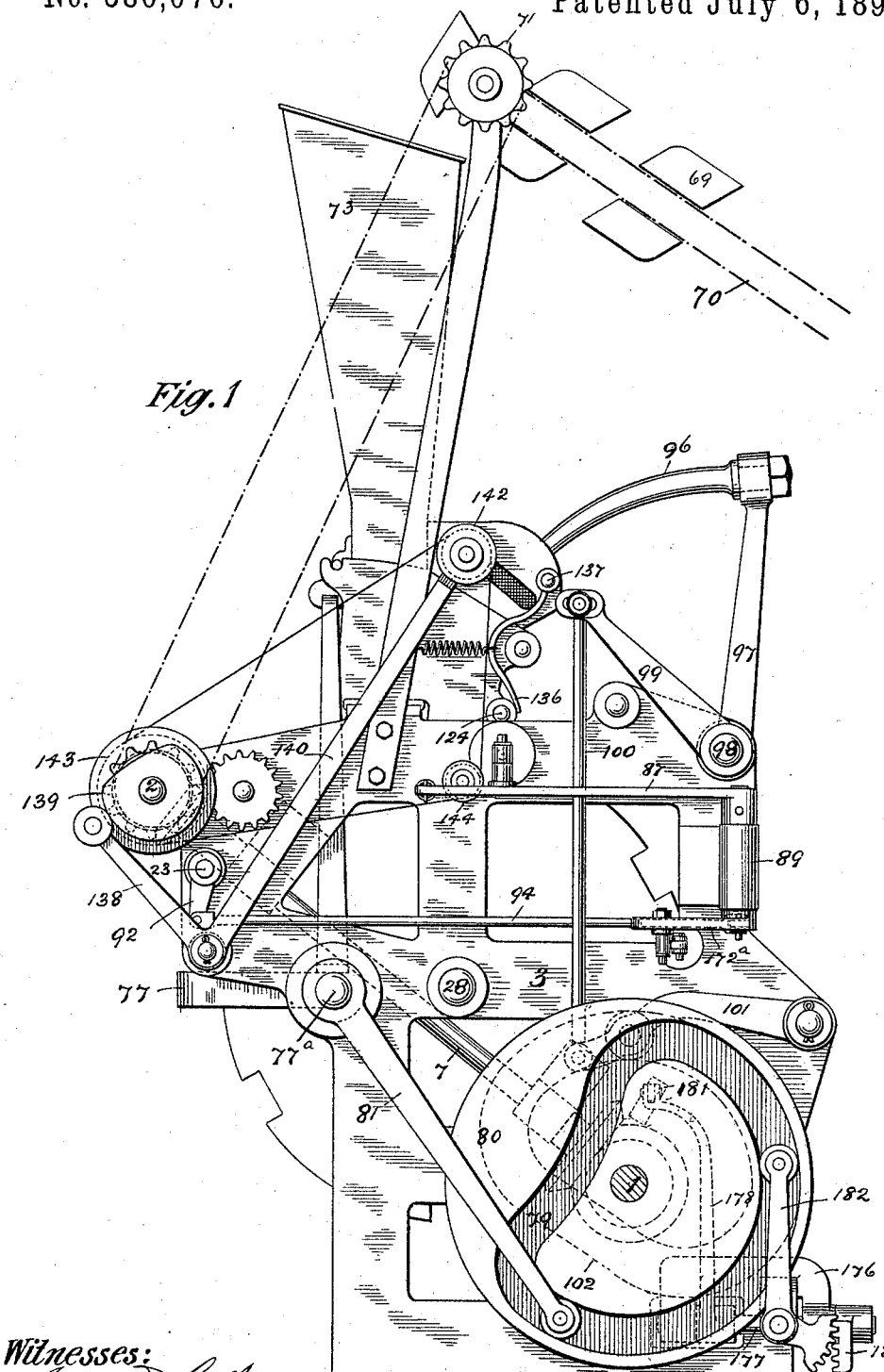

(No Model.) 15 Sheets—Sheet 1.

W. ROSE.
MACHINE FOR MAKING UP TOBACCO OR OTHER SIMILAR MATERIAL IN PACKETS.

No. 586,076. Patented July 6, 1897.

Witnesses:
James N. Catlow
Jessie B. Kay

William Rose, Inventor
by Robt. H. Duncan, Atty.

(No Model.) 15 Sheets—Sheet 3.

W. ROSE.
MACHINE FOR MAKING UP TOBACCO OR OTHER SIMILAR MATERIAL IN PACKETS.

No. 586,076. Patented July 6, 1897.

Witnesses:
James M. Catlow
Jessie B. Kay

William Rose, Inventor
by Robt H. Duncan Att'y.

(No Model.)  15 Sheets—Sheet 4.
W. ROSE.
MACHINE FOR MAKING UP TOBACCO OR OTHER SIMILAR MATERIAL IN PACKETS.
No. 586,076. Patented July 6, 1897.

Witnesses:
James N. Catlow
Jessie B. Kay.

William Rose, Inventor
by Robt. H. Duncan Att'y.

(No Model.) 15 Sheets—Sheet 6.

W. ROSE.
MACHINE FOR MAKING UP TOBACCO OR OTHER SIMILAR MATERIAL IN PACKETS.

No. 586,076. Patented July 6, 1897.

Witnesses:
James M. Catlow.
Jessie B. Kay.

William Rose, Inventor
by Robt. H. Duncan Att'y.

(No Model.)  
15 Sheets—Sheet 8.

W. ROSE.
MACHINE FOR MAKING UP TOBACCO OR OTHER SIMILAR MATERIAL IN PACKETS.

No. 586,076.  
Patented July 6, 1897.

Witnesses:  
James N. Catlow  
Jessie B. Kay

William Rose, Inventor  
by Robt. H. Duncan, Atty (No Model.) 15 Sheets—Sheet 9.
W. ROSE.
MACHINE FOR MAKING UP TOBACCO OR OTHER SIMILAR MATERIAL IN PACKETS.
No. 586,076. Patented July 6, 1897.
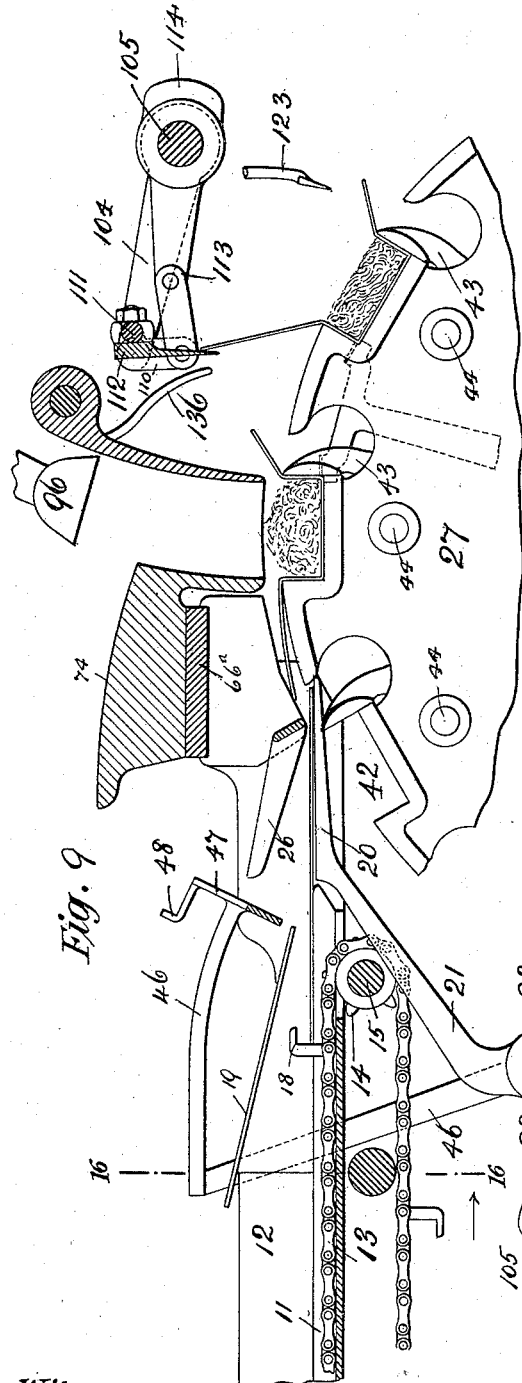
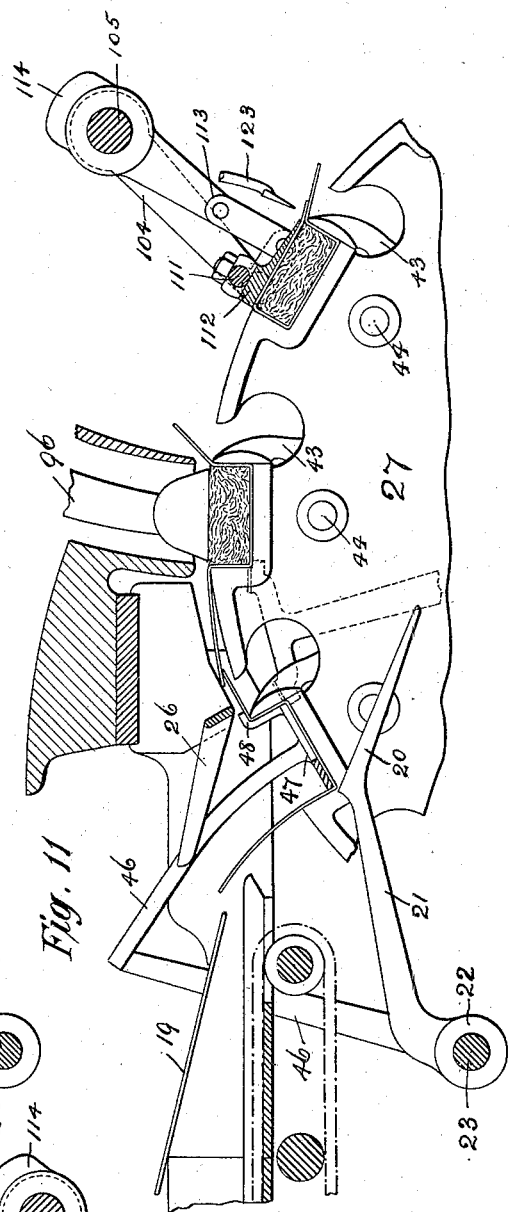
Witnesses:
James N. Batlow
Jessie B. Kay.
William Rose, Inventor
by Robt. H. Duncan Att'y.
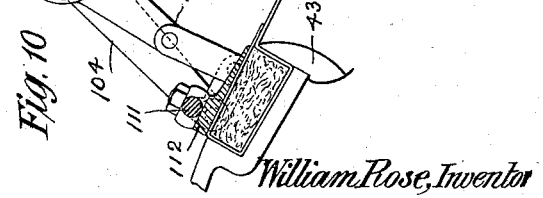

(No Model.) 15 Sheets—Sheet 10.
W. ROSE.
MACHINE FOR MAKING UP TOBACCO OR OTHER SIMILAR MATERIAL IN PACKETS.
No. 586,076. Patented July 6, 1897.
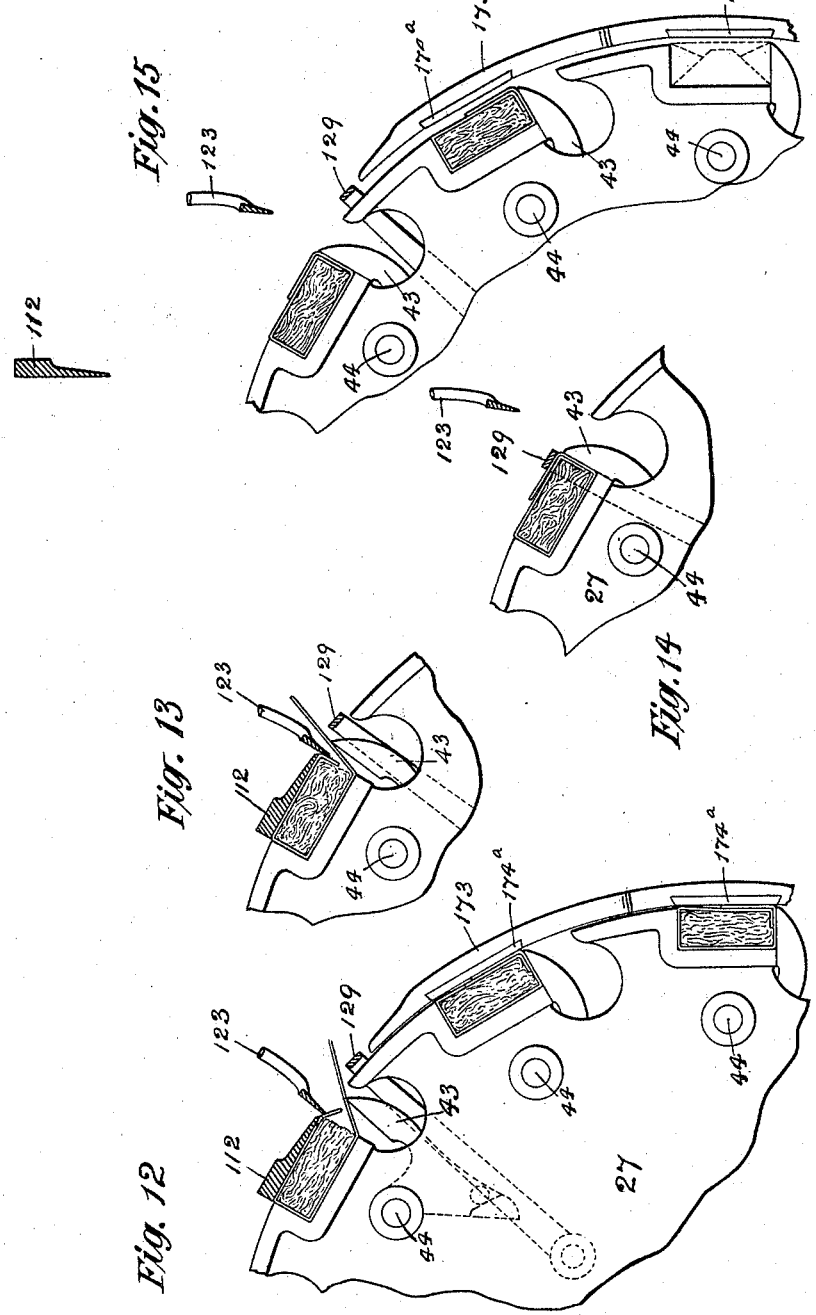
Witnesses:
James N. Catlow.
Jessie B. Kay.
William Rose, Inventor
by Robt. N. Duncan, Attorneys (No Model.)  15 Sheets—Sheet 11.

W. ROSE.
MACHINE FOR MAKING UP TOBACCO OR OTHER SIMILAR MATERIAL IN PACKETS.

No. 586,076.  Patented July 6, 1897.

Witnesses:
James N. Catlow
Jessie B. Kay.

William Rose, Inventor
by Robt. H. Duncan, Att'y.

(No Model.) 15 Sheets—Sheet 12.

W. ROSE.
MACHINE FOR MAKING UP TOBACCO OR OTHER SIMILAR MATERIAL IN PACKETS.

No. 586,076. Patented July 6, 1897.

Witnesses:
James M. Cattow.
Jessie B. Kay.

William Rose, Inventor by Robt. H. Duncan, Att'y.

(No Model.) 15 Sheets—Sheet 13.
W. ROSE.
MACHINE FOR MAKING UP TOBACCO OR OTHER SIMILAR MATERIAL IN PACKETS.
No. 586,076. Patented July 6, 1897.
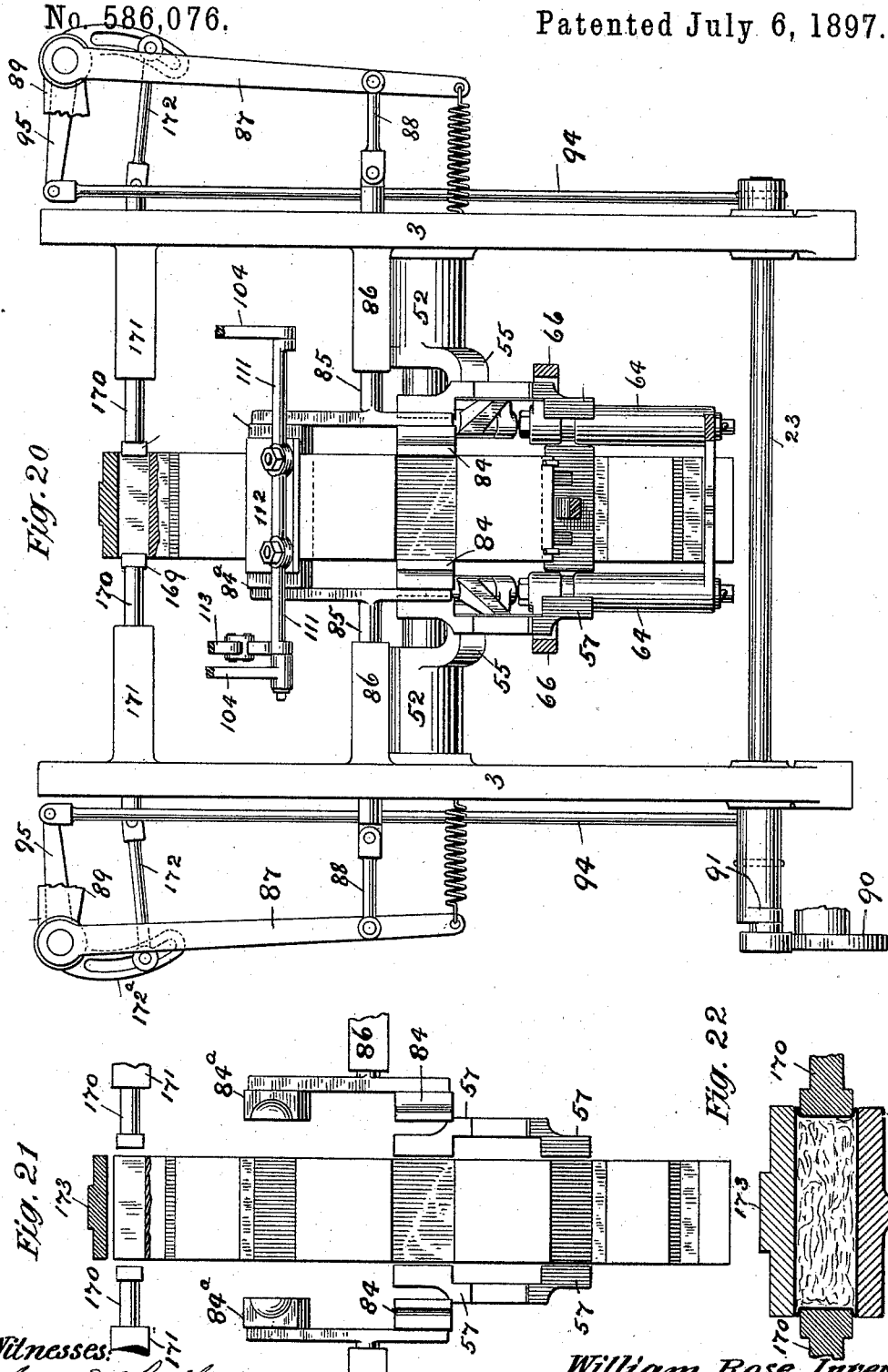
Witnesses:
James N. Catlow
Jessie B. Kay
William Rose, Inventor
by Robt. H. Duncan, Atty.

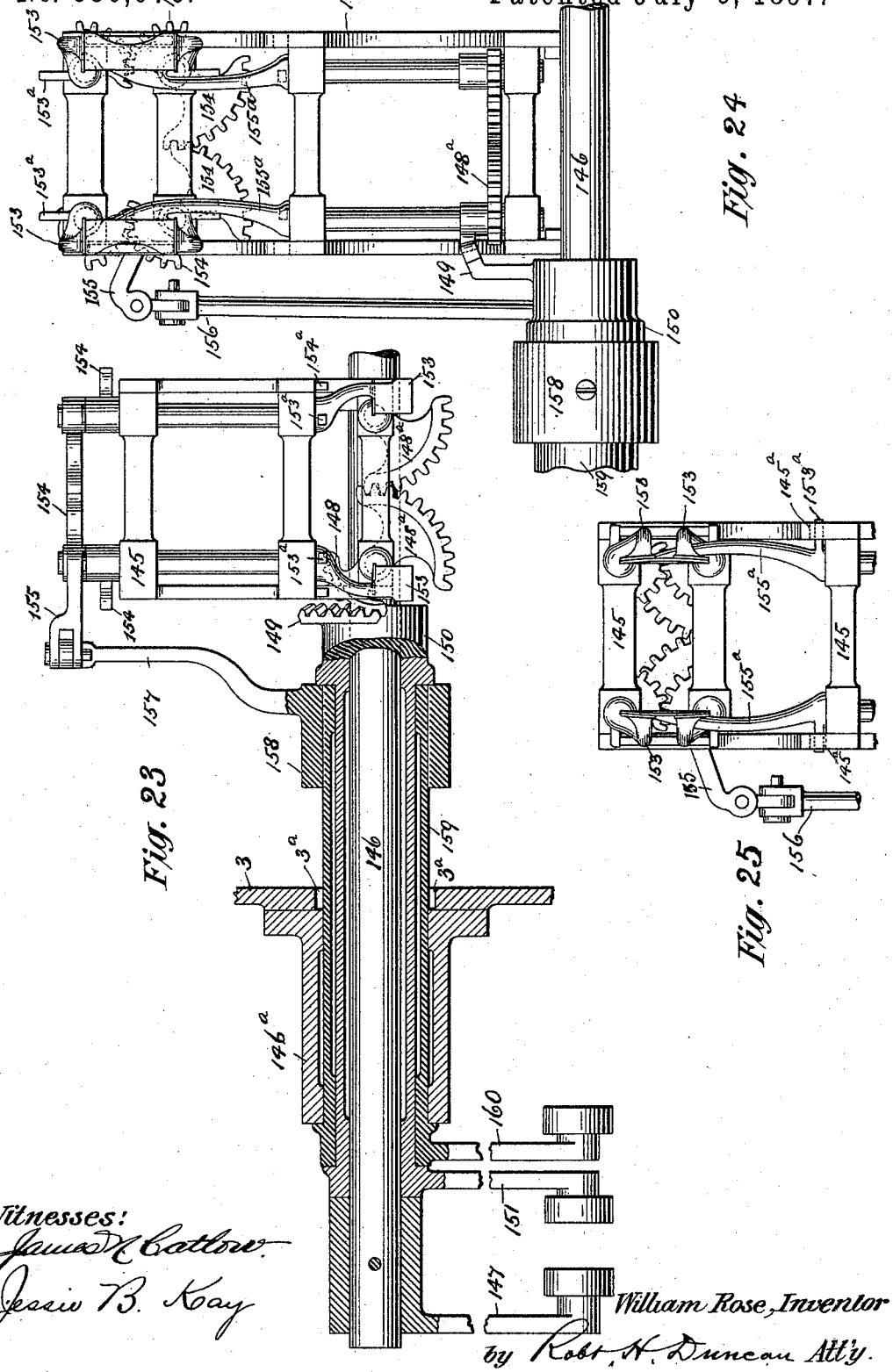

(No Model.)
W. ROSE.
MACHINE FOR MAKING UP TOBACCO OR OTHER SIMILAR MATERIAL IN PACKETS.
No. 586,076.
Patented July 6, 1897.
15 Sheets—Sheet 15.
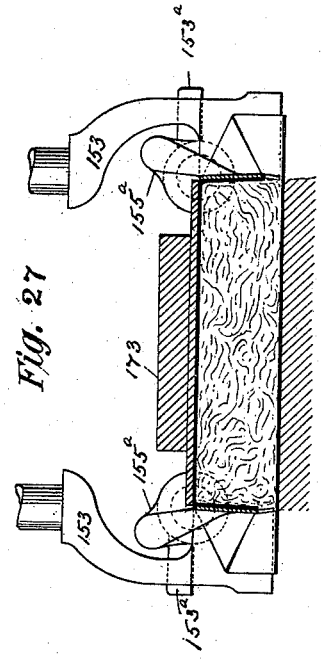
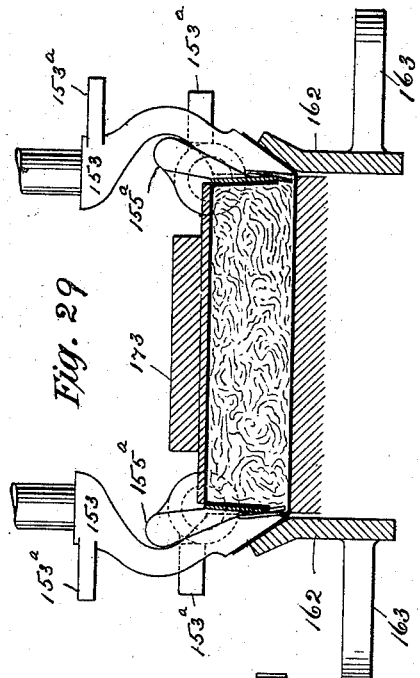
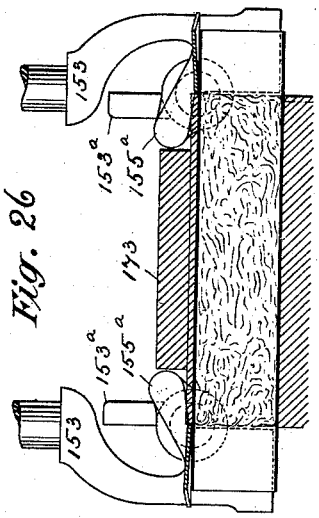
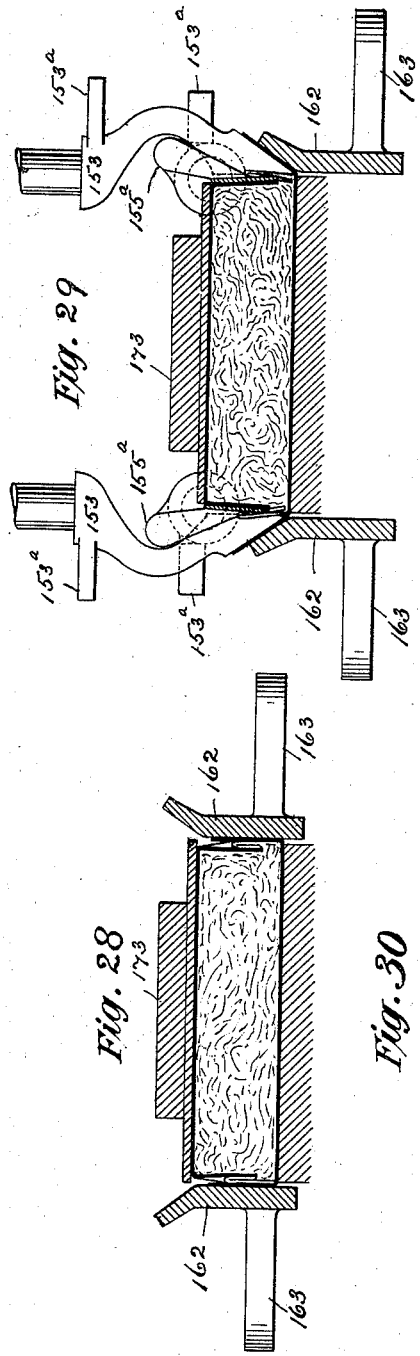
Witnesses:
James N. Catlow.
Jessie B. Kay.
William Rose, Inventor
by Robt. H. Duncan, Attorney.

UNITED STATES PATENT OFFICE.

WILLIAM ROSE, OF GAINSBOROUGH, ENGLAND, ASSIGNOR TO THE WRIGHT'S AUTOMATIC TOBACCO PACKING MACHINE COMPANY, OF LYNCHBURG, VIRGINIA.

MACHINE FOR MAKING UP TOBACCO OR OTHER SIMILAR MATERIAL IN PACKETS.

SPECIFICATION forming part of Letters Patent No. 586,076, dated July 6, 1897.

Application filed April 1, 1896. Serial No. 585,756. (No model.)

*To all whom it may concern:*

Be it known that I, WILLIAM ROSE, engineer, a subject of the Queen of Great Britain and Ireland, residing at Market Street, Gainsborough, in the county of Lincoln, England, have invented certain new and useful Improvements in Machines for Making up Tobacco or other Similar Material in Packets, of which the following is a specification, reference being had to the drawings accompanying and forming a part of the same.

The present invention relates generally to machines for forming tobacco or other materials having similar characteristics into compact rectangular masses of equal weight and inclosing the same in wrappers. Such a machine is illustrated in United States Letters Patent No. 502,637, granted to me under date of August 1, 1893, and the present invention relates to improvements upon the machine therein described and shown.

The features of improvement of my present invention over and above the devices of the machine of my former patent are generally as follows: first, improvements in the wrapper-feeding mechanism; second, improvements in the devices which operate to retain, to form, to crease, and to fold the wrappers in the mold-boxes and around the tobacco; third, improvements in the end-folding mechanism; fourth, improvements in the devices for cleaning and brushing off the tobacco-plunger; fifth, means for countersinking the ends of the packets after the wrappers have been completely folded; sixth, devices for ejecting the finished packets from the mold-wheel, and, seventh, general improvements in the construction, arrangement, and connection of the several mechanisms by which the multiplicity of parts is reduced, economy of space and energy is effected, and the liability of the machine to get out of order largely obviated.

In the following description the side at which the wrappers are fed into the machine will be called the "front," the opposite side will be referred to as the "back," that side on which are located the fast and loose pulleys which transmit power to the machine will be called the "right-hand" side, and the opposite side the "left-hand" side. It may also be here premised that for the sake of clearness none of the views show all the parts, for if this were attempted the complexity of lines would be so great as to render the result unintelligible.

Figure 2:
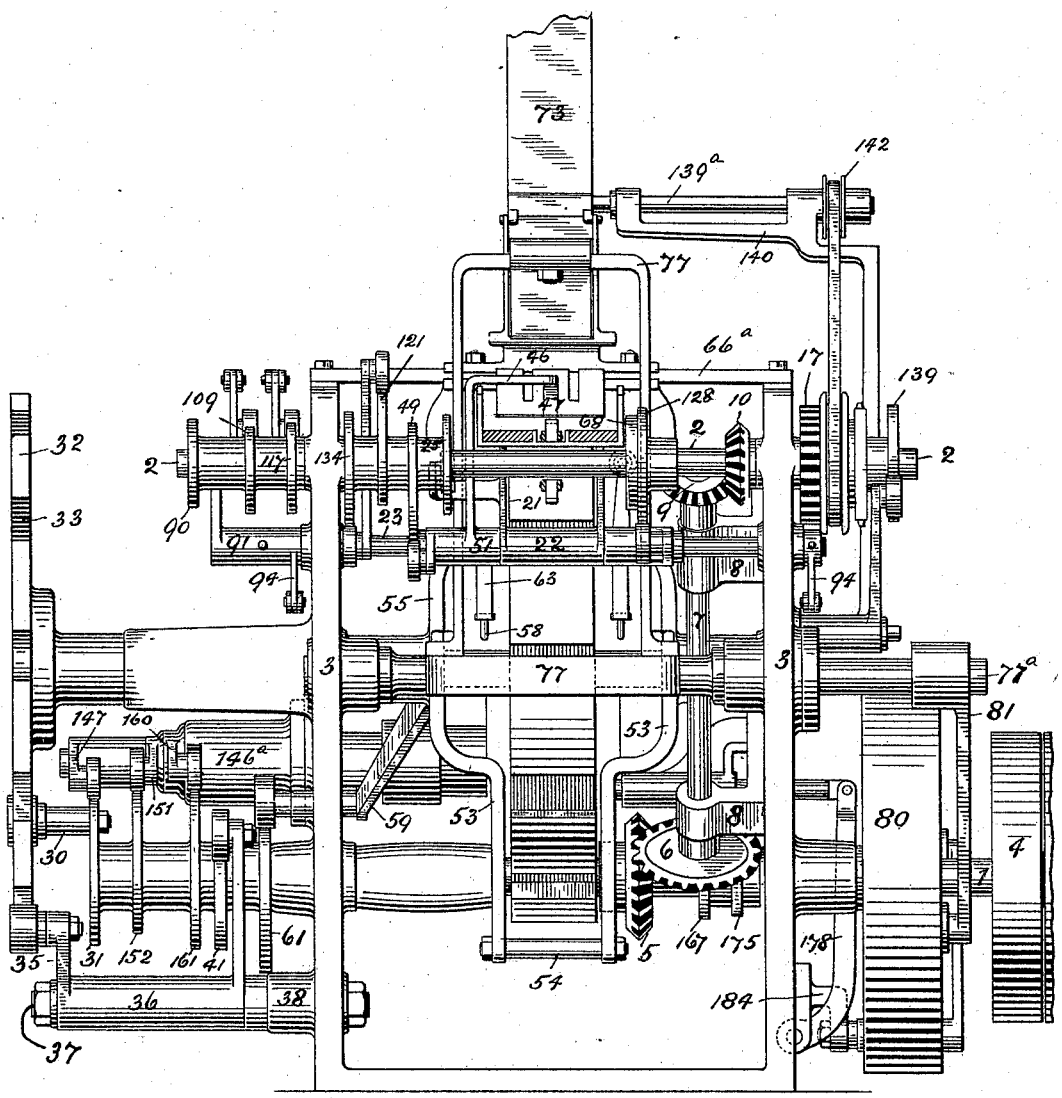
Figure 3:
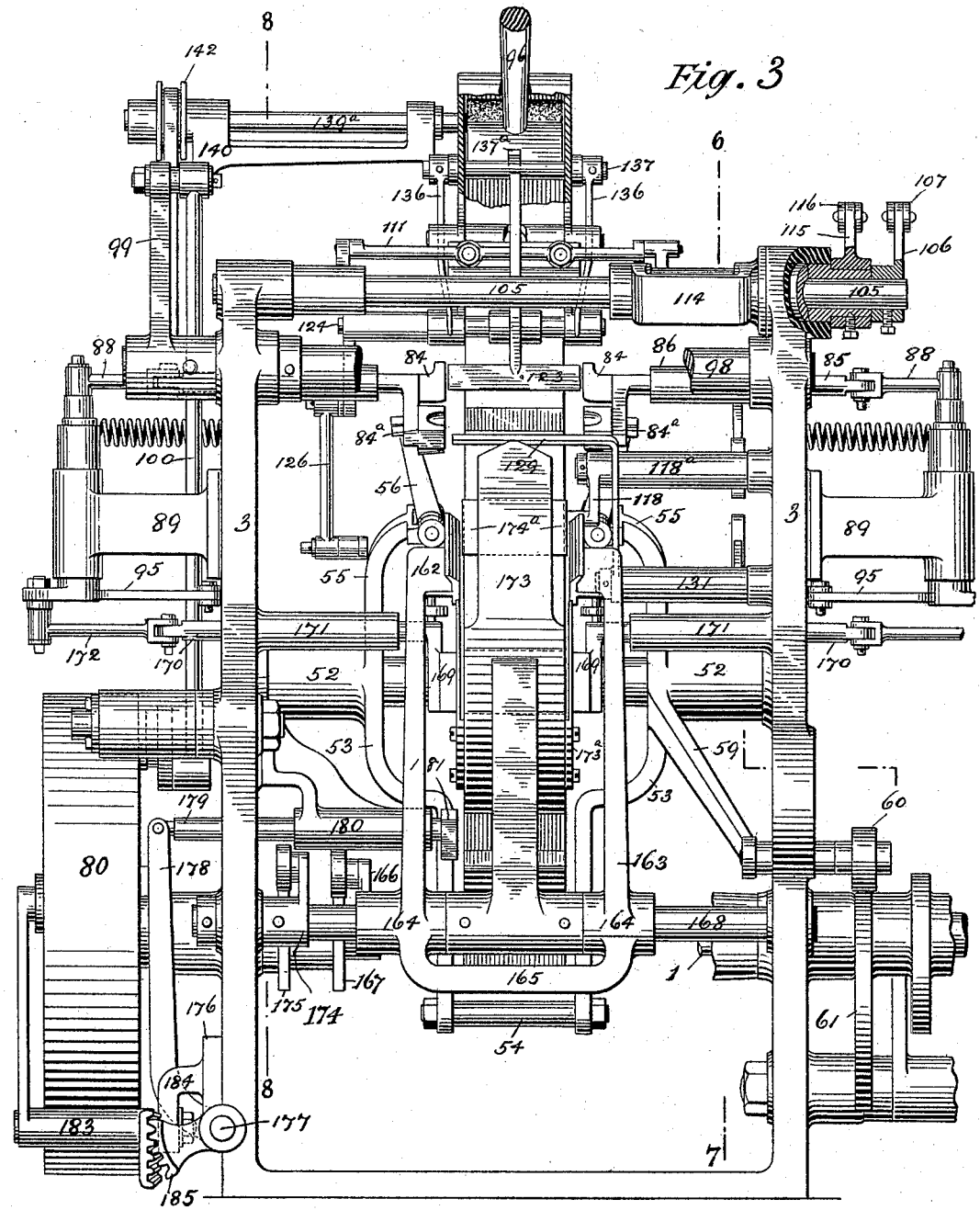
Figure 4:
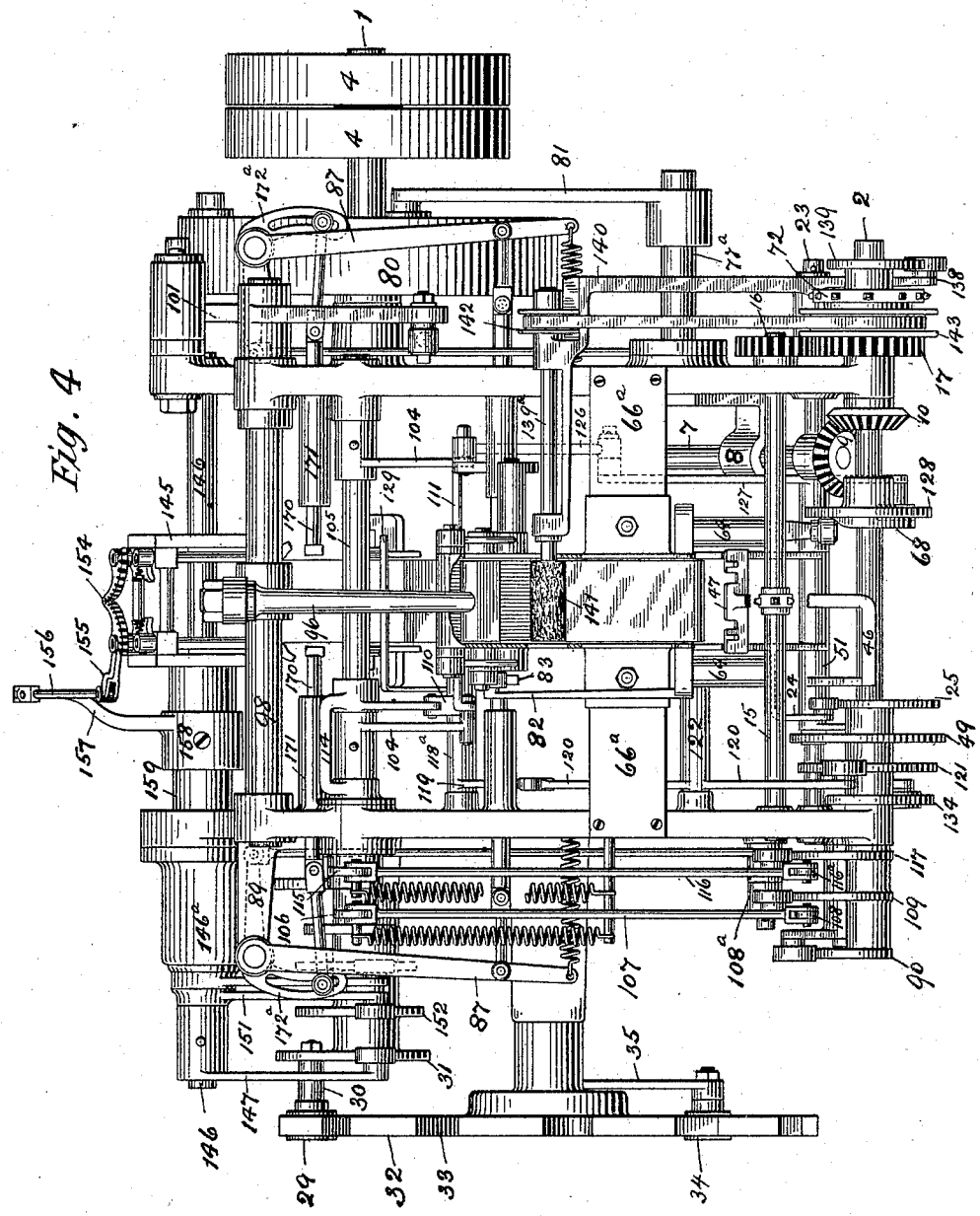
Figure 5:
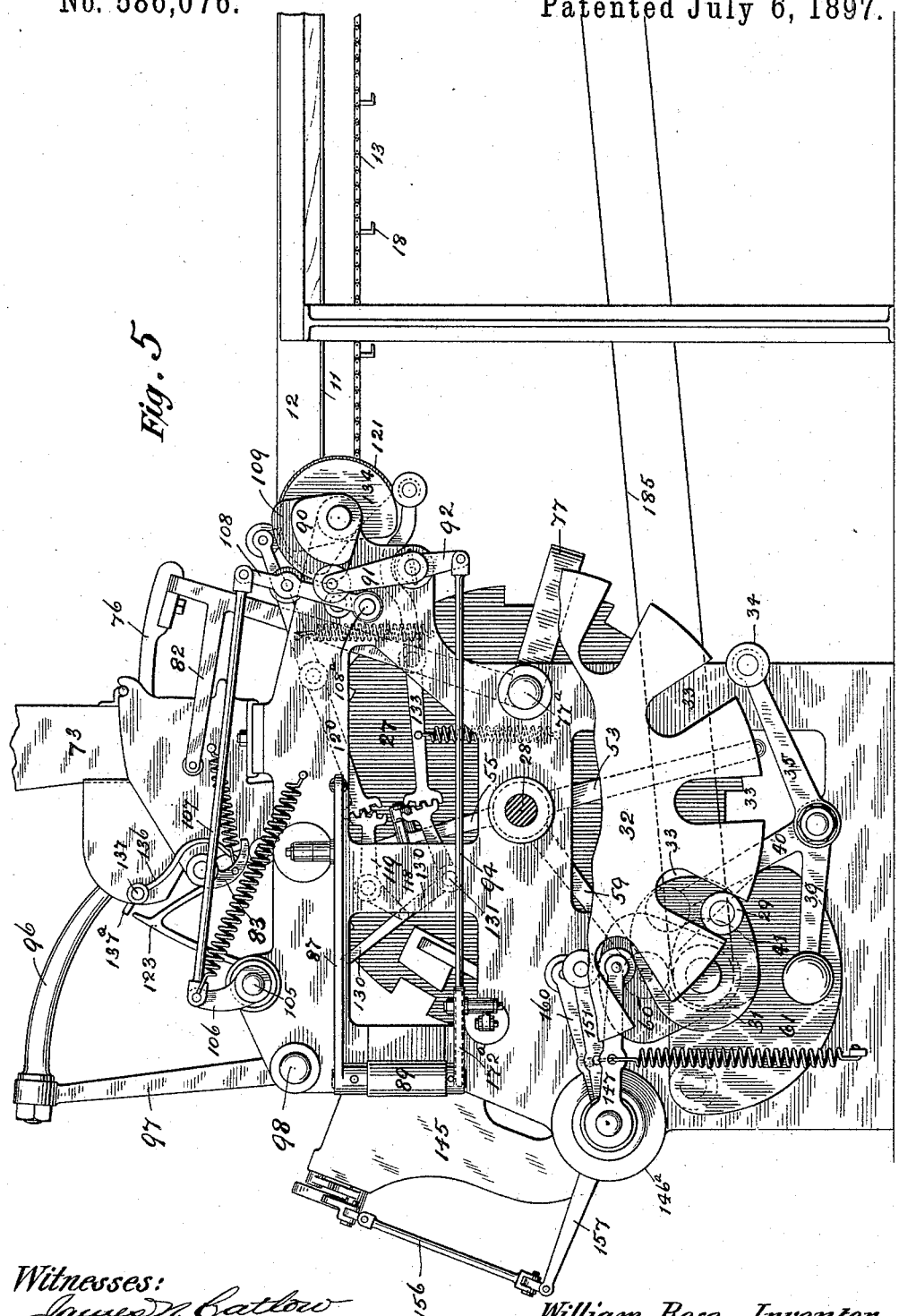
Figure 6:
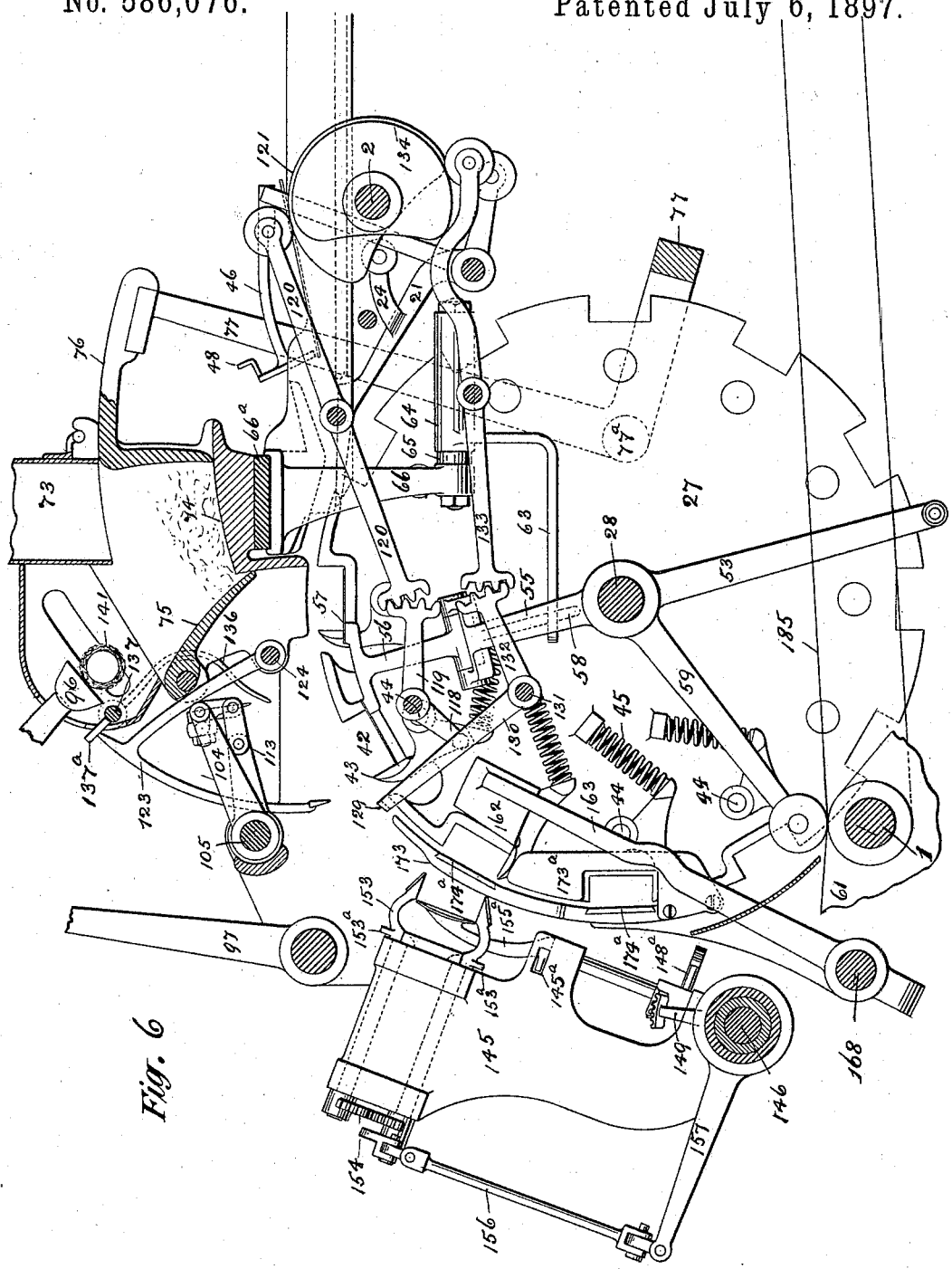
Figure 7:
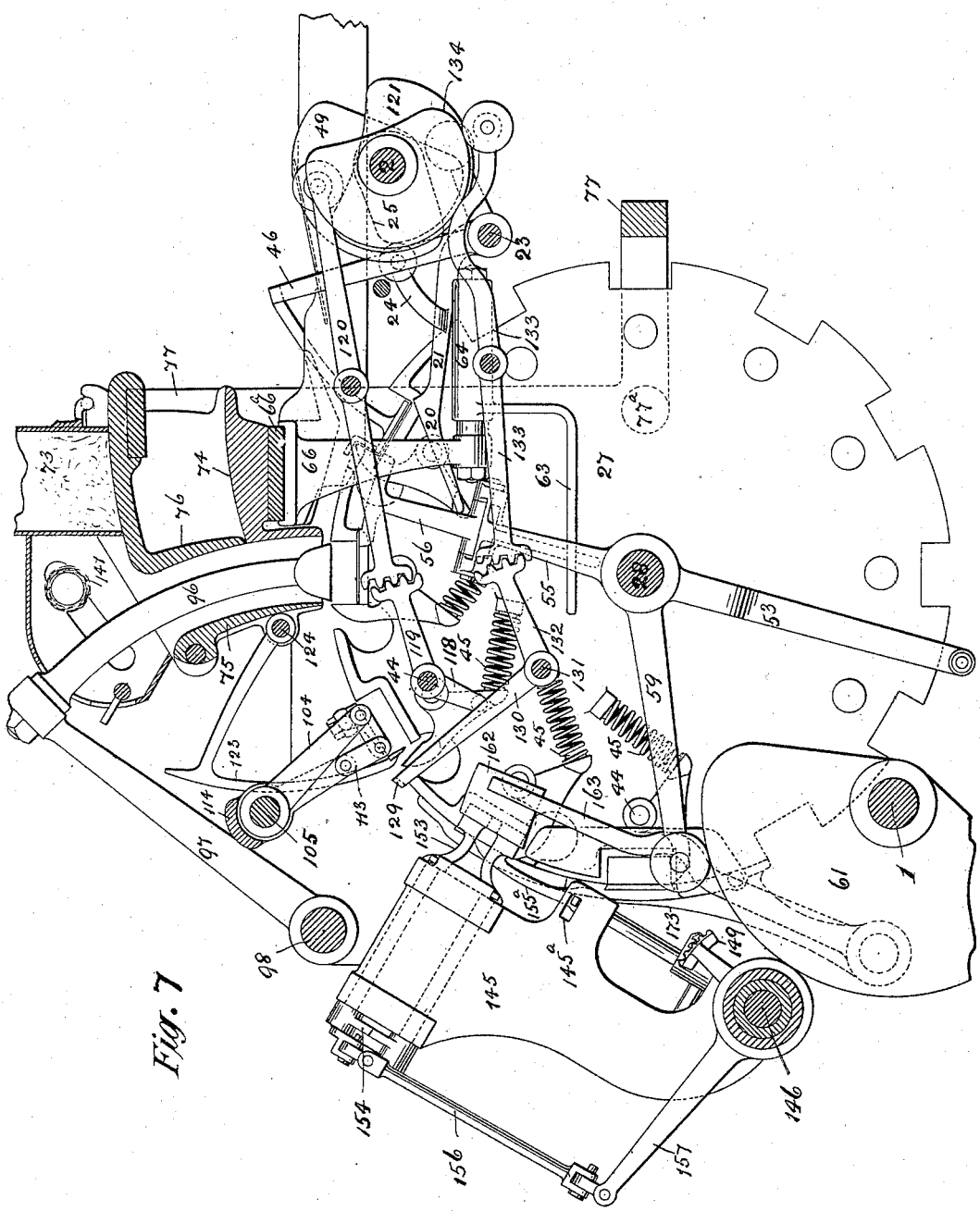
Figure 8:
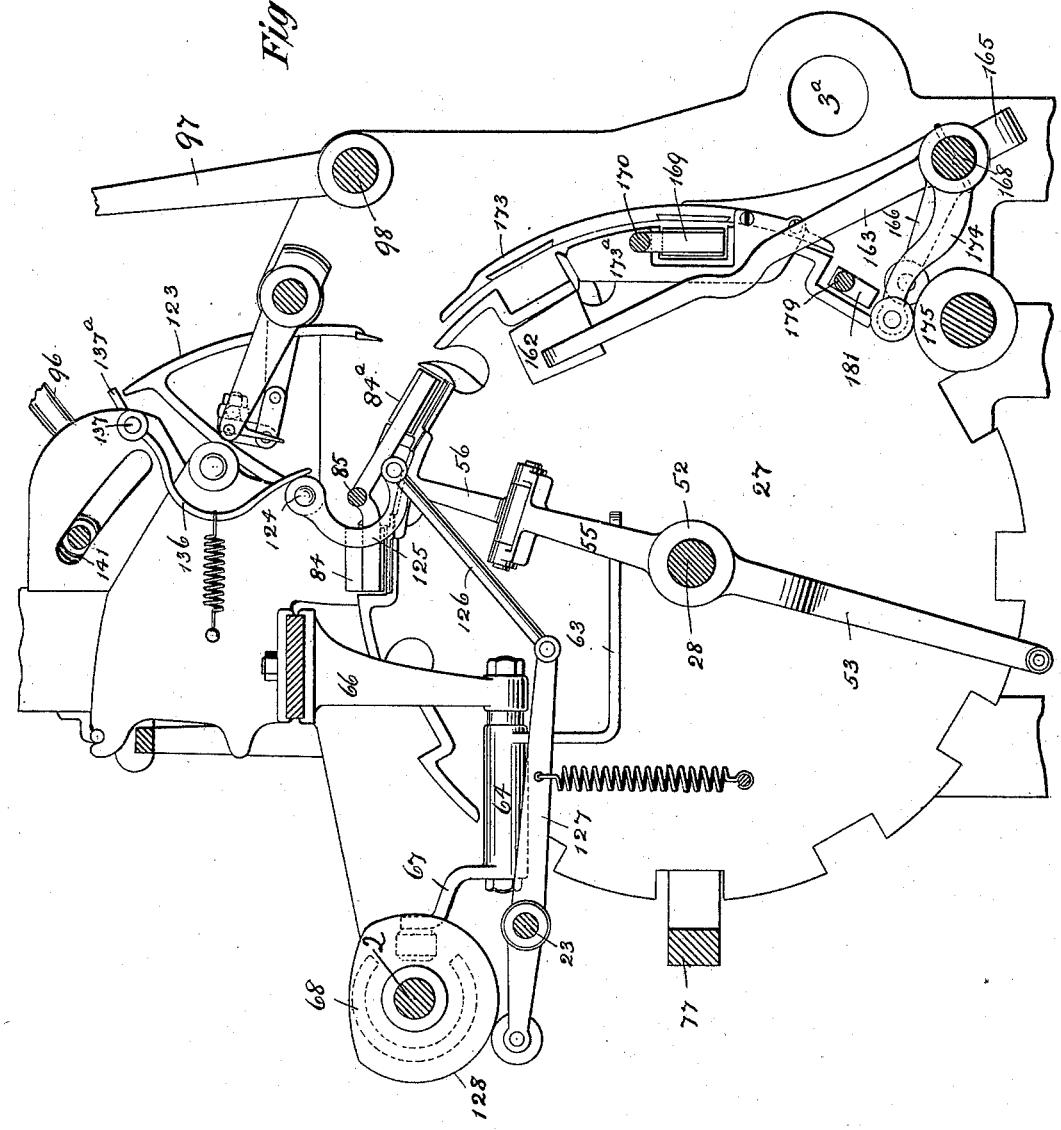
Figure 16:
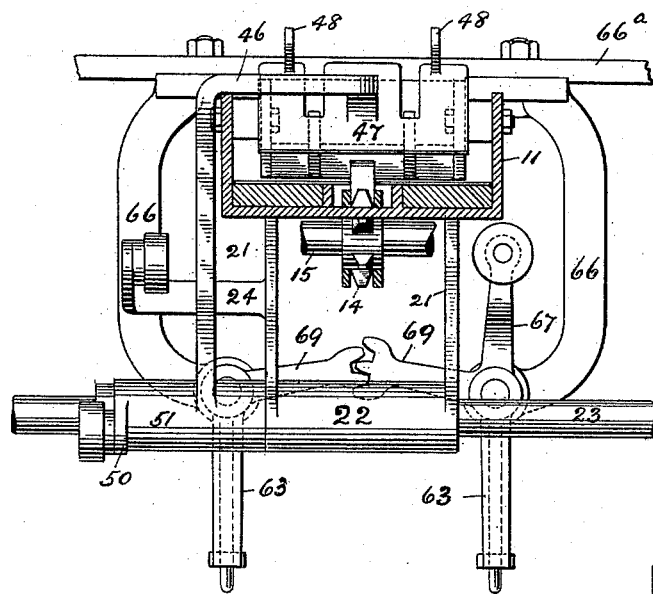
Figure 17:
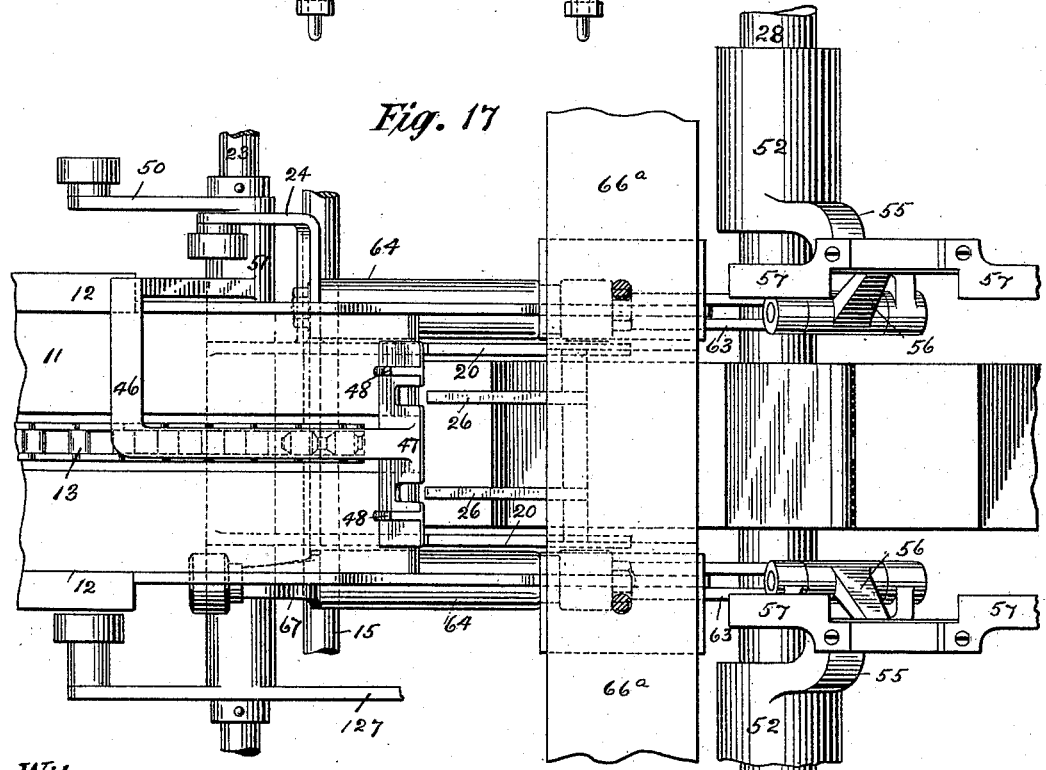
Figure 18:
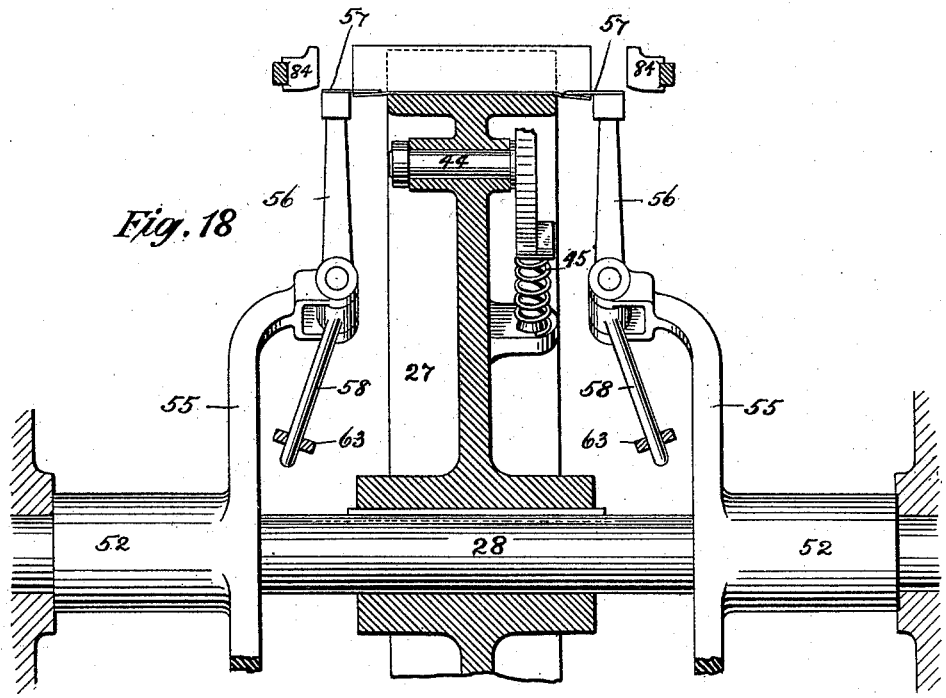
Figure 19:
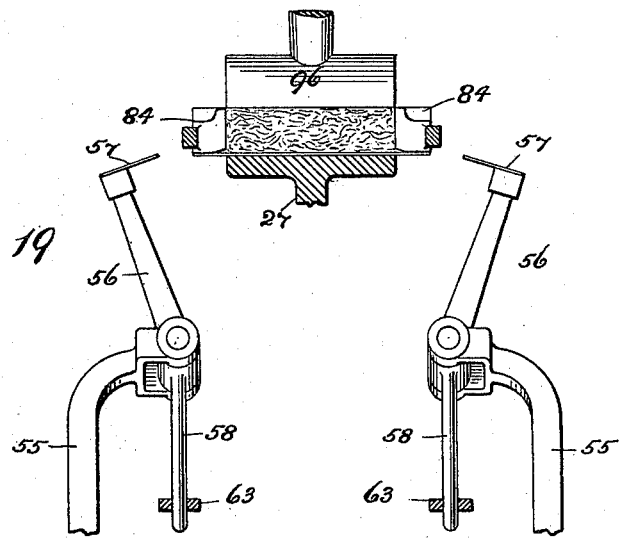

Referring to the drawings, fifteen sheets, Figure 1 is a view in elevation of the right-hand side of a machine. Fig. 2 is an elevation view of the front with the wrapper-feeding device removed. Fig. 3 is a view of the machine in elevation as seen from the rear, certain parts being omitted and others in section. Fig. 4 is a general plan view. Fig. 5 is an elevation view of the left-hand side of the machine, certain parts being broken away. Figs. 6 and 7 are sectional views along broken line 6 7 of Fig. 3, Fig. 6 showing the position of the several plungers, folders, levers, &c., in their withdrawn position and Fig. 7 showing the same parts when they have descended to perform their several operations. Fig. 8 is a view in section along line 8 8 of Fig. 3. Figs. 9, 10, 11, 12, 13, 14, and 15 are detail views showing the sequence of operation of the several parts immediately concerned during the operation of compacting the tobacco and forming the edge folds of the wrapper around the inclosed material. Fig. 16 is a sectional view along lines 16 16 of Fig. 9 looking in the direction of the arrows. Fig. 17 is a plan view of the wrapper-feeding mechanism, showing part of the mold-wheel and also the side clips, more particularly hereinafter referred to. Figs. 18, 19, and 20 are detail views of the side clips. Fig. 21 is a detail view showing the blocks constituting the end walls of the mold-boxes during the formation of the tobacco mass and also the punches for countersinking the ends of the completely-folded packets. Fig. 22 is a detail view in section of parts shown in Fig. 20, with a packet in position while being countersunk. Fig. 23 is a detail view of the end-folding mechanism, partly in section; and Figs. 24 and 25 are detail views, in front elevation, of parts shown in Fig. 20 in different position. Figs. 26, 27, 28, and 29 are detail views of the end-folding fingers, illustrating the relative positions and operations of the same during the operation of completing the end folds; and Fig. 30 is an end view of a completely-folded packet, showing the several folds before they are countersunk.

Power is applied to the main shaft 1, which is journaled in bearings in the main frame 3 of the machine by means of pulleys 4. On this shaft is mounted a beveled gear-wheel 5, meshing with a similar gear-wheel 6, carried on a shaft 7, obliquely mounted in brackets 8 on the main frame. The main shaft 1 also carries a series of disk or edge cams, by which motion is transmitted to the end-folding devices, to the star-wheel, to the frame carrying the side clip, to the last of the end-folders, and to the presser-plate. Also mounted on the shaft is a wheel bearing cam-grooves actuating the rocking frame and the ejecting devices, as well as the tobacco-plunger. All these different motions and devices will be more particularly hereinafter described.

On the upper end of shaft 7 is mounted a beveled gear-wheel 9, meshing with a similar wheel 10, mounted on the shaft 2, and transmitting motion thereto from the main shaft 1. Upon the shaft 2 is mounted another series of cams transmitting motion, respectively, to the end plungers and countersinkers, to the edge-folders, to the movable sides of the mold-boxes, to the wrapper-presser, to the movable platform for receiving the wrappers, and to the side clips, all as will be more fully hereinafter described. Upon this shaft 2 is also mounted a gear-wheel driving the wrapper-feeding chain, also a pulley, over which passes a belt, by means of which the cleaning-brush is operated, a sprocket-wheel which drives the tobacco-feeding hoppers, and a cam for oscillating the cleaning-brush. It will thus be seen that all the various movements of the different devices may be traced to either shaft 1 or 2.

Describing the operation of the machine in detail and commencing with the wrapper-feeding mechanism, 11 is a wrapper-feeding trough having sides 12, which serve as side guides to the wrappers during their passage through the trough. In a groove in the feeding-trough runs an endless chain belt 13, driven by sprocket-wheels 14, (see Figs. 5, 9, 16, and 17,) mounted on shaft 15, driven by gear 16, meshing with a gear-wheel 17, mounted on shaft 2, Figs. 2 and 4. Carried upon chain-wheel 13 are projections or propellers 18, which engage with the wrappers to carry them forward through the feeding-trough, Figs. 9, 16, and 17. Over the end of the wrapper-feeding trough is a downwardly-projecting plate 19, which directs the wrappers downwardly onto the movable divided or two-part platform 20, which consists of two edge plates (one on each side of the mold-wheel) carried on arms 21, which are attached to sleeves 22, journaled on shaft 23, the movable platform being actuated by means of a bent arm 24, attached to one of the arms 21, said arm 24, having a friction-bowl bearing on a cam 25, mounted on shaft 2. In Figs. 9 to 11 these several devices are shown, the arms and cams actuating them being omitted, these arms and cams being clearly shown in Figs. 6 and 7. Two rigid arms or plates 26, having downwardly-inclined under-faces, serve to guide the wrappers down onto the movable platform 20, over the mold-boxes, as shown in Fig. 9, these plates being so arranged that the wrappers can pass underneath their lower and forward ends or edges.

A mold-wheel 27 is rigidly mounted on a shaft 28, journaled in the main frame of the machine, and is rotated intermittently by means of a star-wheel 32, keyed to the same shaft. This star-wheel receives motion through friction-bowl 29, carried on a stud 30, mounted on cam 31 on the main shaft 1. The friction-bowl 29 operates the star-wheel 32 by successively entering recesses 33, formed in said wheel, and by the rotation of said cam 31 driving it forward the distance between two consecutive recesses, thus acting as a single-toothed gear. Simultaneously with the disengagement of friction-bowl 29 with one of the recesses 33 and the consequent stoppage of the star-wheel another friction-bowl 34 is caused to enter another of said recesses to hold the disk or star-wheel and the mold-wheel positively stationary. This friction-bowl 34 is carried on an arm 35, attached to a sleeve 36 on a stud 37, journaled in a boss on the main frame. (See Fig. 5.) The sleeve 36 also carries two other arms 39 and 40, the arm 39 being provided with a weight which operates to keep a friction-bowl borne on the arm 40 always in contact with a cam 41, mounted on the main shaft 1, by which the friction-bowl 34 is caused to enter and withdraw from the recesses 33 in the star-wheel 32, said cam 41 being so timed as to cause the friction-bowl 34 to enter a recess in the star-wheel simultaneously with the exit of friction-bowl 29 from another of said recesses and causing said friction-bowl 34 to be withdrawn from engagement with the star-wheel when friction-bowl 29 enters another of said recesses to move the wheel forward. By these means the mold-wheel is given an intermittent motion, being moved by each revolution of the cam 31 through a distance equal to that from the center of one mold-box to the center of the next succeeding. (See Figs. 2 and 5.)

Upon the periphery of the mold-wheel 27 are formed any number (in the drawings I have shown twelve) of recesses or rectangular mold-boxes 42. One side 43 of each mold-box is made movable, so as to assist in the folding of the wrappers around the tobacco, the movable sides 43 being mounted on spindles 44, carried on the mold-wheel, and are held in normal position by the tension of springs 45, also mounted on projections on the mold-wheel.

Taking up again the devices which operate upon the wrappers and the material to be contained therein to form the same into packets and assuming that a wrapper has been fed into the position shown in Fig. 9, a bent arm 46, carrying a plate 47, descends upon the wrapper while it is supported by the movable platform 20, the plate 47 and platform 20 securely holding the wrapper between them. The platform then moves downwardly along the outside of the ends of the mold-box with the presser-plate, which latter descends to the bottom of the box, pressing the wrapper down and causing it to conform to the shape of the box and at the same time laying the forward edge of the wrapper down upon the periphery of the mold-wheel by means of the ends of the bent fingers 48, which overreach the top of the mold-box in the position shown in Fig. 11. Movement is imparted to the presser-plate by means of cam 49 on the shaft 2, operating on a friction-bowl carried on the arm 50 on the sleeve 51, which also carries the bent arm 46, (see Figs. 2, 4, 6, 7, and 17,) the sleeve 51 being mounted on shaft 23.

Immediately the wrapper is deposited in the bottom of the mold-box in the position shown in Fig. 11 the presser-plate is withdrawn from the mold-box, whereupon devices for retaining the wrapper in position during the rotation of the mold-wheel to bring the wrapper under the tobacco-feeding mechanism are set in operation as follows: Upon the mold-wheel shaft 28 are carried two sleeves 52, each having arms 53 projecting downwardly to just below the mold-wheel, where they are connected by bolt 54, so as to move together. The sleeves 52 also carry each an upwardly-projecting and inwardly-curved arm 55. Hinged in a fork on the end of these arms 55 are arms 56, each carrying two wrapper-clips 57 for holding the wrappers in position in the mold-boxes, these arms 56 being hinged so as to move to and from the mold-wheel and into and out of engagement with the wrappers by means of tailpieces 58, which engage the forks 63, said forks 63 being mounted on sleeves 64 on studs 65 on downwardly-projecting hangers 66, which are bolted to a cross-bar 66ª on the main frame. Upon one of the sleeves 64 is an upwardly and forwardly projecting arm 67, which bears against the face-cam 68, mounted on shaft 2, the revolution of this cam operating to move the arms 56 and clips carried thereon into and out of engagement with the wrappers. The sleeves 52 and arms 55, together with arms 56, carried thereon, are rotated back and forth, moving forward at the same time and to the same extent as the mold-wheel by means of a lever 59 on one of the sleeves 52, carrying a friction-bowl 60, bearing on a cam 61 on the main shaft 1.

Assuming that a wrapper is pressed down in the mold-box, the wrapper-clips will be opposite the ends of the mold-boxes, one clip opposite each end of the box containing the wrappers and another opposite each end of the box containing a wrapper with tobacco deposited upon it. The clips will then be moved toward the mold-boxes and engage the upper surfaces of the wrappers by the operation of cam 68, both sides working in unison by means of toothed arms 69 meshing together, said arms being mounted on the sleeves 64. (See Figs. 3, 8, and 18.) The wrapper is now in the mold-box with the clips engaging the upper surface and the wrapper-plunger 47 has been returned to its first position ready to act upon another wrapper. The moment the presser-plate 47 and the tobacco-plunger 96 (to be hereinafter described) are out of engagement with the mold-wheel the mold-wheel begins to rotate and simultaneously therewith the cam 61 on the main shaft 1 operates upon the friction-bowl carried on arm 59, connected to one of the arms 53, to actuate the wrapper-clip frame to give it motion with the mold-wheel, the wrapper-clips being kept in engagement with the upper surface of the wrappers by the forked arms 63, so that the mold-wheel and the wrapper-clips in engagement with the wrappers are moved simultaneously forward until the mold-box carrying the unfilled wrapper comes directly under the tobacco-hopper and its adjacent forward mold-box carrying a wrapper which has received tobacco has been moved one step beyond the hopper, when the rotation of the mold-wheel is arrested by the friction-bowl carried on arm 35 entering a recess on the star-wheel 32, and the movement of the wrapper-clips stops at the same time as the mold-wheel, and the clips are returned to their original position by the reverse rotation of sleeves 52 and connecting-arms.

We now come to the tobacco-packing devices. Tobacco or similar material is fed in proper quantities by means of buckets 69, carried on an endless chain 70, passing over sprocket-wheel 71, geared to sprocket-wheel 72, carried on shaft 2 to the hopper 73, down which it falls onto the plate 76. (See Figs. 1, 6, and 7.) The frame 77 then withdraws, and in so doing the tobacco is pushed off plate 76 onto bottom plate 74. The plate 76, carried on rocking frame 77, mounted on shaft 77ª, journaled in the main frame, is oscillated back and forth by the action of a cam-groove 79 in wheel 80 on the main shaft 1, said cam-groove 79 giving the frame 77 movement back and forth under the hopper through the medium of a friction-bowl carried on arm 81, which is rigidly attached to the frame 77. (See Fig. 1, 6, and 7.) In advancing, the pusher-plate 76 pushes the tobacco off the bottom plate 74 and at the same time opens the tobacco-chute by swinging the plate 75 on its hinge by means of an arm 82, carried on frame 77, striking against an ear 83, which in connection with a spring normally holds the plate 75 in position to close up the tobacco-passage. Being pushed off the plate 74 by the plate 76 and the tobacco-chute being open, the tobacco falls upon the wrapper in the mold-box directly underneath, into the ends of which have been immediately before projected the blocks 84, carried on arms attached to rods 85, sliding in extended bearings 86 on the main frame, these blocks forming end walls to the mold-box to give rectangular shape to the tobacco mass. The rods 85 at their outer ends are pivotally connected by a link 88 to levers 87. These levers 87 are rigidly connected to spindles journaled in brackets 89 on the main frame, and said levers 87 are operated by means of arms 95, fastened to the lower ends of the spindles, which are connected by rods 94 to downwardly-projecting arms 92, fastened to rock-shaft 23 and operated by a cam 90, bearing against a friction-bowl carried on an upwardly-projecting arm 91 on the left-hand side of the machine, which, together with the downwardly-projecting arms 92, form a double-crank lever. The cam 90 operates to withdraw the blocks from the mold-boxes, and two coiled springs attached to the forward ends of the arms 87 and to the main frame operate to project the blocks into the mold-boxes when permitted by the cam 90. (See Figs. 3, 4, and 23.)

As soon as the blocks 84 are in position in the mold-box the tobacco falls down into the rectangular receptacle thus formed. The tobacco-plunger 96 then descends and, acting with the side blocks 84, presses the mass of tobacco into a compact rectangular mass. The plunger 96 is secured to a lever 97, keyed to shaft 98, rigidly attached at one end of which is an arm 99, to which is adjustably secured in a slot formed therein rod 100, which is connected to a bent arm 101, carrying a friction-bowl working in cam-groove 102 on the inner face of wheel 80, journaled on the main frame 1, the arm 101 being mounted on a stud on the main frame. (See Fig. 1.) The tobacco-plunger now withdraws and the end blocks 84 are withdrawn as the wrapper-clips move into engagement with the wrappers, both with the wrapper which has just received the tobacco and the wrapper which has been deposited in the next rear mold-box, whereupon the mold-wheel, with the side clips engaging the wrappers, makes another partial revolution to bring the forward mold-box containing a wrapper with tobacco compressed thereon under the operation of the edge-folding devices and the next rear mold-box underneath the hopper to receive its charge of tobacco.

At each upward movement of the tobacco-plunger 96 a cleaning mechanism operates to clean off any particles of tobacco or similar material which may be clinging to the plunger 96. This device comprises an elbow-lever journaled on a stud on the main frame, one arm of said lever 138 carrying a friction-bowl contacting with a cam 139 on shaft 2. The other arm 140 of this elbow-lever is bent at right angles and is provided with bearings in which revolves a shaft 139$^a$, which projects through a slot in the lower part of the tobacco-hopper 73 and carries at that end a brush 141 and at the other end a pulley 142. This pulley 142 is revolved by means of a belt receiving motion from a pulley 143 upon shaft 2, said belt passing over a return-pulley 144, journaled on a stud on the main frame, thus forming a triangular belting, whereby continuous rotary motion is given to the brush during its movement back and forth across the lower face of the plunger 96. This oscillating motion is given to the brush by the revolution of cam 139. (See Figs. 1, 2, 3, and 4.)

The device by which the first edge of the wrapper is folded down has a compound action and comprises the levers 104, keyed to shaft 105, actuated by means of the arm 106, keyed to said shaft and connected with a rod 107, connected to arm 108 on stud 108$^a$, said arm 108 carrying a roller in contact with a cam 109 on shaft 2. One of the levers 104 has pivoted at its outer end bell-crank lever 110, formed on one arm of which is a spindle or shaft 111, whose other end is journaled on the opposite arm 104, said shaft 111 carrying the presser-foot 112. The other arm of the bell-crank lever has a toggle connection 113 with a yoke-sleeve 114 on the shaft 105, actuated by the arm 115, mounted on yoke-sleeve 114, extending through bearings on the frame. (See Figs. 3, 4, 5, and 9.) A rod 116 is connected at one end to arm 115 and at its other end to an arm 116$^a$, mounted on stud 108$^a$, the said arm 116$^a$ having a friction-bowl bearing on cam 117 on shaft 2, Fig. 4. These devices operate as follows: The toe of the presser or folder foot 112 engages with the upstanding edge of the wrapper, and to insure that the toe of this folder shall always engage the paper I provide arms 136, one on each side of the hopper, journaled on a spindle 137. These arms operate to throw the paper forward by a quick jerky motion and are actuated by a spur on the folder 123 striking against a projecting ear 137$^a$ on spindle 137. (See Figs. 5, 6, and 9.) When the folder 112 is in engagement with the upstanding edge of the wrapper, the cams 109 and 117 revolve and operate the shaft 105 and sleeve 114 in unison to bring down the presser-foot to fold down the wrapper edge from the position shown in Fig. 9 to the position shown in Fig. 10, the folder operating with a wiping and creasing action upon the package, so as to form a good square corner edge. When the parts are in the position shown in Fig. 10, the arms 104 remain stationary a moment, while the toggle 113 under the action of its cam operates the toe of the presser-foot to bring the wrapper into close contact with the material of the packet, but without depressing the heel of the foot, as shown in Fig. 11, this result being accomplished by the rocking of the shaft 111, to which the presser-foot is attached at its heel. The movable side 43 of the mold-wheel is now withdrawn (see Fig. 12) by the action of the lever 118 on a sleeve 118$^a$, journaled on a stud projecting from the main frame on the left-hand side of the machine, Figs. 3 and 5, which presses down upon a projection formed on the movable side 43, being operated by arm 119, attached to sleeve 118ᵃ, said arm 119 carrying a toothed sector engaging with a similar sector carried on arm 120, whose other end carries a friction-bowl bearing on cam 121, carried on the shaft 2, said arm 120 being pivoted by means of a sleeve 122, journaled on a stud on the left-hand side of the machine on the inner face of the main frame 3. As the movable side 43 is thus withdrawn the finger-folder 123 descends to tuck in the overlapping edge of the wrapper (the first folder being meanwhile returned) and is then withdrawn, and simultaneously with its withdrawal the movable side 43 returns to position, Figs. 12 and 13. The tucking-in folder 123 is carried on a spindle 124, connected by a bent-arm lever 125, which is connected by a link 126 with an arm 127, journaled on a sleeve carried on a shaft 23, the other end of said arm 127 bearing a friction-bowl bearing against the cam 128 on the shaft 2. (See Fig. 8.)

Immediately the movable side of the mold-box 43 has returned to its position pressing against the side of the package the folder 129 folds down the last upstanding edge of the wrapper, Figs. 12 to 14. The folder 129 is carried on arm 130 of a double crank journaled on a stud 131, projecting from the inner face of the left-hand side of the main frame. The other arm 132 of said double-crank lever carries a toothed sector meshing with a similar toothed sector carried on arm 133, pivoted on a stud projecting from the left-hand side of the main frame on the inner side thereof, the other end of which arm 133 carries a friction-bowl bearing against the cam 134, carried on shaft 2. (See Fig. 6.) During this operation of folding the edges of the wrapper the blocks 84ᵃ, carried on slide-rods 85, have been moved close up to the ends of the mass of tobacco to serve as extensions thereof upon which to form the several folds. The upper faces of these blocks are slightly concave to form receptacles for particles of tobacco which may become detached from the mass and prevent the same from interfering with the process of folding the wrappers about the tobacco mass. (See Fig. 21.) These blocks 84ᵃ, together with the blocks 84, are moved to and from the mold-wheel at each partial revolution of the same, as hereinbefore described. As soon as the last edge-folder 129 has folded down the last edge it is returned to its normal position by its cam, (see Fig. 15,) thus permitting blocks 84ᵃ to withdraw from the partly-folded packet, when the mold-wheel makes another partial revolution to bring the packet in position to be operated upon by the end-folders.

In a frame 145 are located the end-folding devices or the devices by which the last folds are given to the ends of the wrapper. This frame 145 is rigidly mounted on shaft 146, which is mounted in a journal 146ᵃ, secured to the frame 3 on the left-hand side of the machine, said shaft also passing through an aperture 3ᵃ in the main frame. (See Figs. 23, 24, and 25.) Upon the shaft 146 is keyed a lever 147, carrying a friction-roll bearing on cam 31, which operates to cause the whole frame 145, carrying the end-folders, to move into and out of operating position at each partial revolution of the mold-wheel, Figs. 4, 6, 7, and 23. In this frame 145 are journaled the two top-folding fingers 155ᵃ, which are operated by toothed sector 148 meshing with toothed sector 149, carried on sleeve 150 on shaft 146, said sleeve bearing an arm 151, on which is a friction-bowl bearing against cam 152 on shaft 1, these two top-folders being connected so as to operate together by intermeshing sectors 148ᵃ. The four side and end folders 153 are journaled in the frame 145 and are connected together by meshing toothed sectors 154, so as to operate together, and they receive motion by means of an arm 155 on the shaft of one of the folders 153, this arm 155 being connected by means of a rod 156 to a lever-arm 157 on a collar 158, keyed to sleeve 159 on shaft 146, Figs. 23 to 25. This sleeve 159 is provided with an arm 160, carrying a friction-roll bearing upon cam 161 on the main shaft 1. The fingers 153 are made wedge shape in form, the inner faces being slightly hollowed out and the outer faces so shaped as to present, when said fingers are in their turned-in position after having operated to fold in the side tabs, a smooth inclined surface parallel with the inclined portion of the last folder, (hereinafter to be described,) and the extreme tip of these folders 153 forms an edge for giving a sharp well-defined crease to the last tab or fold of the wrapper before it is finally laid against the preceding tabs. The last tab or fold is the bottom one, which is made by the folders 162, carried on arms 163 on sleeves 164, journaled on shaft 168, the arms 163 being connected so as to operate together by the yoke 165. (See Fig. 3.) One of the sleeves 164 is provided with an arm 166, carrying a friction-bowl bearing against a cam 167 on shaft 1. (See Figs. 2, 3, and 8.)

A curved movable holding-plate 173 covers two or more of the mold-boxes and the periphery of the mold-wheel at that portion of the mold-wheel where the end folding and the countersinking take place, this curved holding-plate being preferably provided with flat plates 174ᵃ, which press upon the outer faces of the packets to cause them to retain their shape while the end folding and countersinking devices are operating. Plate 173 is also provided with side plates 173ᵃ, projecting on each side of the mold-wheel, which serve to retain in place the end folds of the packets. This holding-plate 173 is keyed to shaft 168 and is caused to press upon the packets when the mold-wheel is stationary by means of rod 174, also keyed to shaft 168, said rod carrying a friction-bowl bearing against cam 175 on shaft 1. During the rotation of the mold-wheel, however, the cam operates to hold the plate 173 out of contact with the mold-wheel, thus giving the plate 173 intermittent motion to and away from the mold-wheel. (See Figs. 2 and 3.)

The movable presser-plate having been moved into position pressing upon the outer faces of the packets, the end-folding devices operate as follows: The frame 145 is first moved to position by its cam, the folders 155ª operate to turn down the wrapper on the upper side of the package, the side end fingers or folders 153 then fold in the side tabs against the back faces of folders 155ª, Figs. 26 and 29, and then the last folder-plates 162 turn the bottom flaps upwardly and tightly press them against the outer faces of the folders 153, at the same time creasing this last tab or fold over the bottom edge of the folders 153. The several folders press the flaps or tabs between their respective faces for an instant, and then the folder-plates 162 are retracted to allow the fingers 153 and the folders 155ª to be withdrawn, whereupon the plates 162 under the action of their cam are again moved upward to a greater extent than before and operate to press the last folds or tabs against those already in place and by their upward sliding and pressing action against the tabs leave the ends of the packet smooth and firmly compressed, as shown in Figs. 28 and 30. The last folders 162 are then returned to their first position and the presser-plate is moved away from contact with the mold-wheel and at the same time the frame 145 is withdrawn from operating position to allow the mold-wheel to make another partial revolution.

An important feature in connection with the operation of the folding-fingers 153 and 155ª is that their range of movement is positively limited. The fingers 153 are each provided with projections 153ª, which strike against lugs 154ª on the frame 145 when the fingers have folded down their respective tabs. The folders 155ª are likewise provided with projections 153ª, working in slots 145ª in frame 145, the movement of the folding-fingers 155ª being arrested by the projections 153ª striking against the ends of the slots 145ª. (See Figs. 23 to 25.) Another partial rotation of the mold-wheel brings the packet opposite the end punches 169, which are carried on spindles 170, working in bearings 171, projecting inwardly on both sides of the machine upon the inner faces of the main frame. The rods 170 are connected by a link-rod 172, which is secured at the other end in arc slots in sector-arms 172ª, by means of which arc slot the rod 172 may be adjusted so as to give any desired amount of countersinking to the ends of the packets. The sector-arms 172ª are secured to the spindles journaled in bracket 89 and are operated at the same time and by the same means as operate the end blocks 84 and 84ª, namely, the cam 90 on shaft 2, (see Figs. 1, 5, 20, 21, 22, and 23,) to punch or countersink the ends of the now completely-folded packet to retain the folds in place.

To eject the completed packet from the mold-wheel, the following devices are provided: A bracket 176 is fixed on the lower right-hand side of the main frame. Working in bearings on this bracket is a shaft 177, to which is secured an arm 178, connected to a rod 179, sliding transversely in journal-bracket 180 and carrying the ejector 181, which works into and out of the mold-box to push out the packets. These ejecting devices are operated by means of an arm 182, carrying a friction-bowl working in a cam-groove 79 in wheel 80, said arm 182 being mounted on a sleeve 183 on a spindle carried on the standard 184. Upon the sleeve 183 is mounted a toothed sector 185, meshing at right angles with another toothed sector keyed on shaft 177, to which is attached the lever-arm 178. (See Figs. 1 to 3.) The rotation of the wheel 80 operates through the connections to give reciprocal movement to the rod 179 to thrust the ejector 181 into the mold-box and push out the completed packet onto a conveyer-belt 185 and then withdraw the same for the further rotation of the mold-wheel.

It will be observed that in the machine above described the mechanism for introducing and fitting the wrappers into the mold-boxes and the mechanism for delivering the tobacco upon the introduced wrappers are so located that they do not operate in connection with the same mold-box at the same period of rest, but the wrapper is introduced into a mold-box at the same period of rest at which the tobacco is delivered to the next advanced mold-box. In this particular this machine is distinguished from prior machines of somewhat similar construction and operation in which the wrappers and tobacco are both delivered to the same mold-box during the same period of rest, and it possesses the advantage of greater capacity by reason of the shorter periods of rest required for the operations or of less rapid movements of the mechanisms with consequently less wear and tear.

What is claimed as new is—

1. In a machine for forming rectangular packets of tobacco or similar material, the combination with mold-boxes or recesses in which the packets are formed, of an endless belt for feeding wrappers in an unfolded condition, a deflecting-plate, as 19, arranged above the delivery end of the feed-belt, and downwardly-inclined arms, as 26, arranged above the mold-boxes when at rest, for guiding the wrappers into position, substantially as shown and described.

2. In a machine for forming rectangular packets of tobacco or similar material, the combination with mold-boxes or recesses in which the packets are formed and means for feeding wrappers in an unfolded condition, of a two-part platform, each part pivoted to swing downwardly along the opposite ends of the mold-boxes for holding the wrappers in position over the mold-boxes, substantially as shown and described.

3. In a machine for forming rectangular packets of tobacco or similar material, the combination with mold-boxes or recesses in which the packets are formed, means for feeding wrappers in an unfolded condition and devices for guiding the wrappers downwardly, of a two-part platform for holding the wrappers in position over the mold-boxes, each part being pivoted to swing downwardly at the opposite ends of the mold-boxes, substantially as shown and described.

4. In a machine for forming rectangular packets of tobacco or similar material, the combination with mold-boxes or recesses in which the packets are formed, of wrapper feeding and receiving mechanism, a wrapper-presser plate provided with fingers conforming to one side of the mold-box and overreaching the top thereof, and means for operating said presser-plate to descend upon and press and fit the wrapper into a mold-box and bend its forward edge down upon the top thereof, substantially as shown and described.

5. In a machine for forming rectangular packets of tobacco or similar material, the combination with mold-boxes or recesses in which the packets are formed and wrapper-receiving mechanism, of a wrapper-receiving platform arranged to swing downwardly on the outside of the mold-box at its opposite ends, and a wrapper-presser plate, whereby a wrapper fed upon the platform is grasped between the platform and the presser-plate and deposited in the mold-box, substantially as shown and described.

6. In a machine for forming rectangular packets of tobacco or similar material, the combination with movable mold-boxes or recesses in which the packets are formed and devices for pressing and fitting wrappers in the mold-boxes, of retaining devices for engaging and holding the wrappers in position while the mold-boxes are moving and means for moving the retaining devices into engagement with the wrappers and then moving them forward with the forward movement of the mold-boxes and then moving them out of engagement with the wrappers and then backward to their engaging position.

7. In a machine for forming rectangular packets of tobacco or similar material, the combination with a series of movable mold-boxes or recesses in which the packets are formed and devices for pressing and fitting the wrappers into the mold-boxes, of devices for engaging the ends of the wrappers projecting from the boxes and retaining them in position while the boxes are moving from the wrapper-receiving to the tobacco-receiving positions, substantially as shown and described.

8. In a machine for forming rectangular packets of tobacco or similar material, the combination of a series of movable mold-boxes or recesses in which the packets are formed and devices for pressing and fitting the wrappers into the mold-boxes and devices for delivering tobacco thereto, of devices for engaging the wrappers of two adjacent molds to retain them in position while the rear mold is moving from the wrapper-receiving to the tobacco-receiving position and the forward mold is moving away from the tobacco-receiving position, substantially as shown and described.

9. In a machine for forming rectangular packets of tobacco or similar material, the combination of an intermittently-rotating mold-wheel, carrying a series of mold-boxes or recesses in which the packets are formed, and devices for pressing and fitting the wrappers in mold-boxes, of retaining devices for engaging and holding wrappers in position in the mold-boxes and mechanism for moving the same with the rotation of the mold-wheel and restoring them to their original position, substantially as shown and described.

10. In a machine for forming rectangular packets of tobacco or similar material, the combination of a mold-wheel provided with mold-boxes or recesses in which the packets are formed and in which wrappers have been fitted, of tobacco delivering and compressing mechanism and blocks, as 84, and means for moving the blocks into and out of engagement with the ends of the mold-boxes, to form end walls for the boxes at the time the tobacco is delivered and compressed therein, substantially as shown and described.

11. In a machine for forming rectangular packets of tobacco or similar material, the combination with mold-boxes or recesses in which the packets are formed and in which wrappers have been fitted, of tobacco delivering and compressing mechanism, blocks, as 84, devices for folding the edges of the wrappers around the tobacco, blocks, as 84$^a$, and means for simultaneously moving the blocks into and out of engagement with the ends of the mold-boxes, whereby blocks 84 will be in engagement with one mold-box while the tobacco is delivered and compressed therein and blocks 84$^a$ will be in engagement with the next advanced box while the folding devices are operating, substantially as shown and described.

12. In a machine for forming rectangular packets of tobacco or similar material, the combination with mold-boxes or recesses in which the packets are formed and wrapper-fitting and tobacco-feeding devices, of a compound wrapper-folding mechanism consisting of a presser-foot, as 112, fixed to a rock-shaft and a toggle mechanism for operating the presser-foot after it has folded down the wrapper edge to further depress the toe of the said foot without depressing the heel thereof, substantially as shown and described.

13. In a machine for forming rectangular packets of tobacco or similar material, the combination with mold-boxes or recesses in which the packets are formed, wrapper-feeding mechanism, tobacco-feeding mechanism and devices for folding the wrappers around the tobacco, of a folding device for making the last end fold provided with an inclined portion whose inner face presses and creases the end tab, and a flat portion for wiping the several folds in position, substantially as shown and described.

14. In a machine for forming rectangular packets of tobacco or similar material, the combination with mold-boxes or recesses in which the packets are formed, wrapper-feeding mechanism, tobacco-feeding mechanism and devices for folding the wrappers around the tobacco, of a device, as 162, for making the last end fold, and means for giving a short upward movement to said device to crease the end fold against the edges of the side folders, as 153, and means for giving a further upward sliding or wiping movement to said device to press the several folds against each other and smooth out the end of the packet.

15. In a machine for forming rectangular packets of tobacco or similar material, the combination with wrapper-feeding and tobacco-feeding devices and devices for forming the tobacco into rectangular masses and folding the wrappers about the same, of dies for countersinking the folded ends of the packets, means for operating said dies consisting of slide-rods 170, links 172 adjustably connected in arc slots 172$^a$, arms 95 connected to rods 94 attached to arms 92 operated by cam 90, substantially as shown and described.

16. In a machine for forming rectangular packets of tobacco or similar material, the combination with an intermittently-rotating mold-wheel provided with mold-boxes or recesses in which the packets are formed, and end folding and countersinking devices, of a holding-plate adapted to press upon and hold the packets in position in two or more of the mold-boxes at the same time, while the wheel is stationary and the end folding and countersinking devices are operating, and means to withdraw the plate while the mold rotates, substantially as shown and described.

17. In a machine for forming rectangular packets of tobacco or similar material, the combination with a mold-wheel provided with mold-boxes or recesses in which the packets are formed, of a curved holding-plate provided with flat plates adapted to press upon the packets contained in the mold-boxes and covered by the said holding-plate, substantially as shown and described.

18. In a machine for forming rectangular packets of tobacco or similar material, the combination with a mold-wheel provided with mold-boxes or recesses in which the packets are formed, and end folding and countersinking devices, of a holding-plate adapted to press upon and hold the packets in position in the mold-boxes while the end folding and countersinking devices are operating, and adapted to be withdrawn while the mold-wheel rotates, said holding-plate being provided with laterally-projecting plates for locking the folds of the packets and protecting the same during the revolution of the mold-wheels.

19. In a machine for forming rectangular packets of tobacco or similar material, the combination with packet-forming devices, of an ejector operating to move into and out of the mold-boxes in which the packets are formed to thrust the same out and means for operating the same comprising cam-operated arm 182, sectors 185, arm 178 and slide-rod 179 carrying the ejector 181, substantially as shown and described.

20. In a machine for forming packets of tobacco or similar material, the combination with a tobacco-packing plunger, of a cleaning-brush mounted on a horizontal rotating shaft journaled in one arm of an elbow-lever and arranged to move in a circular path across the face of the plunger by the oscillation of the elbow-lever, and means for rotating the brush-shaft and oscillating the elbow-lever, substantially as and for the purpose set forth.

W. ROSE.

Witnesses:
J. R. RAITHBY,
J. E. HEWITT.